United States Patent
Ma et al.

(10) Patent No.: US 11,788,955 B2
(45) Date of Patent: Oct. 17, 2023

(54) N×M TERAHERTZ DETECTOR ARRAY IMAGING SYSTEM BASED ON MULTI-FREQUENCY ANTENNA STRUCTURE

(71) Applicant: Guangdong University of Technology, Guangzhou (CN)

(72) Inventors: Jianguo Ma, Guangzhou (CN); Shaohua Zhou, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 397 days.

(21) Appl. No.: 17/207,973

(22) Filed: Mar. 22, 2021

(65) Prior Publication Data

US 2022/0065776 A1 Mar. 3, 2022

(30) Foreign Application Priority Data

Sep. 3, 2020 (CN) .......................... 202010916110.8

(51) Int. Cl.
*G01N 21/35* (2014.01)
*G01N 21/3581* (2014.01)
*H01Q 21/06* (2006.01)

(52) U.S. Cl.
CPC ....... *G01N 21/3581* (2013.01); *H01Q 21/061* (2013.01)

(58) Field of Classification Search
CPC .......................... G01N 21/3581; H01Q 21/061
See application file for complete search history.

(56) References Cited

U.S. PATENT DOCUMENTS

| 2011/0062330 A1* | 3/2011 | Ben-Bassat | G01J 5/20 250/330 |
| 2016/0209268 A1* | 7/2016 | Lee | G01J 1/44 |
| 2016/0305823 A1* | 10/2016 | Ignjatovic | G01J 5/0837 |

* cited by examiner

*Primary Examiner* — Hugh Maupin
(74) *Attorney, Agent, or Firm* — Yong Chen

(57) ABSTRACT

The present application relates to an N×M terahertz detector array imaging system based on a multi-frequency antenna structure, wherein a single-frequency-point terahertz antenna used for receiving terahertz signals in a traditional detector is replaced with a multi-frequency-point terahertz antenna, thereby realizing that one detector supports the detection of multiple arbitrary different frequency points. The traditional detector needs to replace detectors with different frequency points for detection of different frequency points. The present application can design a multi-frequency-point terahertz antenna with arbitrary different frequency points according to actual needs, so that one detector can support the detection of multiple arbitrary different frequency points without the replacement of the terahertz detector, effectively reducing the cost of terahertz detection and imaging.

5 Claims, 1 Drawing Sheet

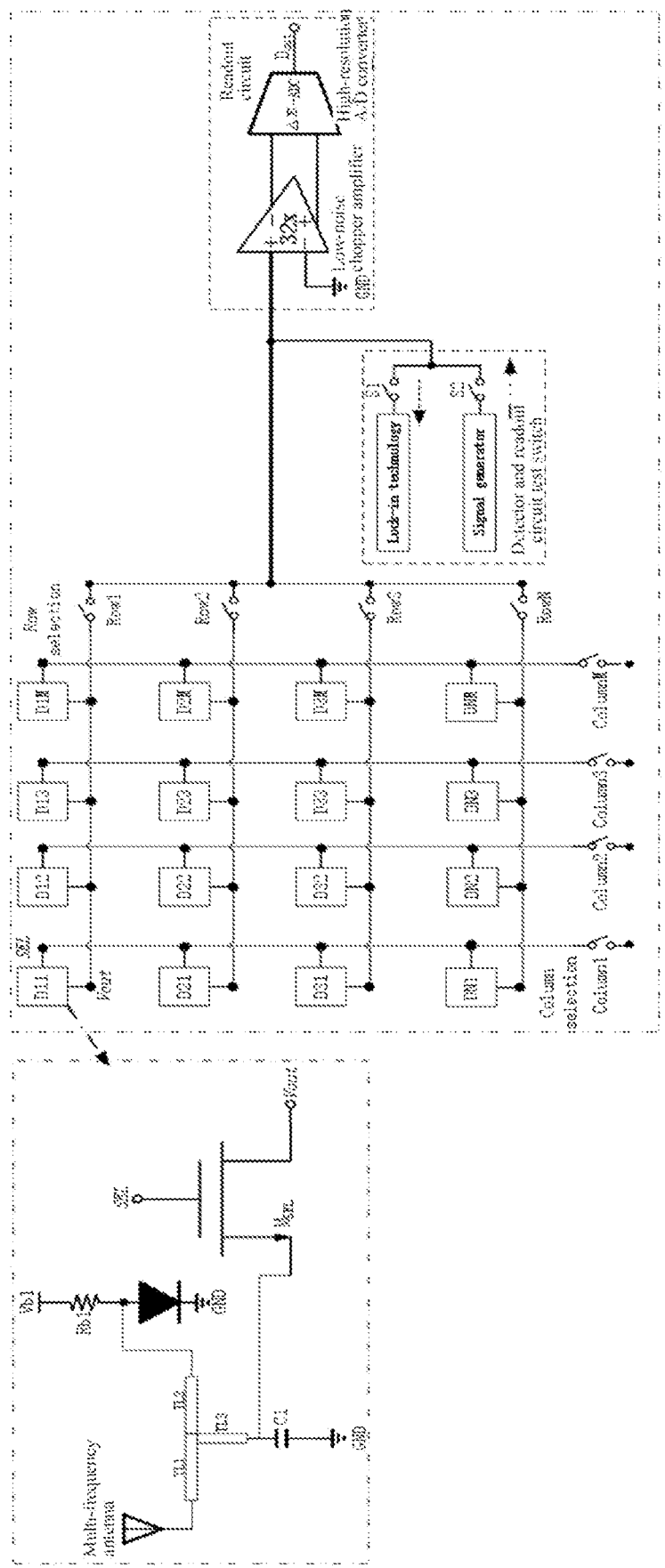

N×M TERAHERTZ DETECTOR ARRAY IMAGING SYSTEM BASED ON MULTI-FREQUENCY ANTENNA STRUCTURE

CROSS-REFERENCE TO RELATED APPLICATIONS

The present application claims the priority of Chinese patent application No. 202010916110.8, filed on Sep. 3, 2020, which is hereby incorporated by reference in its entirety.

TECHNICAL FIELD

The present disclosure relates to the technical field of terahertz detectors, and in particular to an N×M terahertz detector array imaging system based on a multi-frequency antenna structure.

BACKGROUND

Upon nearly 20 years of research, the international scientific and technological community has recognized that THz science and technology is a very important cross-frontier field. Because THz has high spatial resolution and time resolution, it has unique advantages in the aspects of imaging technology and spectroscopy technology. On the other hand, THz has very small energy and will not cause damage to matter, so it has great advantages in comparison with X-ray. Therefore, THz science and technology is likely to be one of the foundations of the new generation of IT industry. The reason why THz research has become a hot spot is also because the energy of THz is too small and its information characteristics are very weak. The lack of technical means limits the progress of theoretical research, and there are many blank points in the research. For example, because the THz radiation source is unstable, there is no standard radiation source and the power of the radiation source is generally low. This requires the development of high-sensitivity, low-cost terahertz detectors.

Schottky diodes have the advantages of fast speed, good nonlinear effects, ability to work at room temperature and easy integration, so they are often used as detector diodes in terahertz detectors. The traditional terahertz detectors based on the Schottky diodes usually adopt a structure with a single single-frequency-point terahertz antenna and a single SBD. However, it is actually required that the terahertz detector can detect multiple different frequency points. This means that different frequency point detectors need to be replaced when different frequency points are detected. In this way, the cost of terahertz detection is undoubtedly increased.

SUMMARY

An objective of the present disclosure is to overcome the shortcomings of the prior art and provide an N×M terahertz detector array imaging system based on a multi-frequency antenna structure, which is intended to realize low-cost, high-sensitivity terahertz detection and imaging.

In order to achieve the above objective, the technical solution provided by the present disclosure is:

an N×M terahertz detector array imaging system based on a multi-frequency antenna structure, comprising an N×M detector array, a detector and readout circuit test switch, and a readout circuit;

wherein the N×M detector array comprises N×M detector units arranged in rows and columns, N row selection switches, and M column selection switches; and each detector unit comprises a multi-frequency-point terahertz antenna, a matching network comprising transmission lines TL1, TL2, and TL3, a DC blocking capacitor C1, a bias voltage Vb1, a bias resistor Rb1, a Schottky diode SBD, and an NMOSFET;

and wherein the multi-frequency-point terahertz antenna is connected to a left port of the transmission line TL1, a right port of the transmission line TL2 is connected to an anode of the Schottky diode SBD, and a cathode of the Schottky diode SBD is connected to ground;

the bias resistor Rb1 is connected between the anode of the Schottky diode SBD and the bias voltage Vb1, and is used to supply power to the Schottky diode SBD;

the transmission line TL3 of the matching network is separately connected to one end of the DC blocking capacitor C1 and an $M_{SEL}$ terminal of the NMOSFET, and the other end of the DC blocking capacitor C1 is grounded;

an SEL terminal of the NMOSFET in each detector unit is connected to a column selection switch of a column where it is located;

a $V_{out}$ terminal of the NMOSFET in each detector unit is connected to a row selection switch of a row where it is located; and the detector and readout circuit test switch is connected between the N row selection switches and the readout circuit.

Further, the matching network adopts a grounded coplanar waveguide transmission line.

Further, port impedance of the multi-frequency-point terahertz antenna is consistent with left port impedance of the transmission line TL1, the left port impedance of the transmission line TL1 is consistent with right port impedance of the transmission line TL2, and the right port impedance of the transmission line TL2 is consistent with port impedance of the anode of the Schottky diode.

Further, the readout circuit comprises a low-noise chopper amplifier and a high-resolution analog-to-digital converter (A/D converter); the low-noise chopper amplifier is connected between the N row selection switches and the high-resolution analog-to-digital converter, amplifies a received terahertz signal and uses chopper circuit technology to reduce the amplifier's own offset and 1/f noise; and the high-resolution analog-to-digital converter digitizes the amplified terahertz signal for back-end signal processing.

Further, the detector and readout circuit test switch comprises a detector test switch S1 and a readout circuit test switch S2; and the detector test switch S1 and the readout circuit test switch S2 are separately connected between the N row selection switches and the readout circuit.

Compared with the prior art, the principle and advantages of the present solution are as follows:

1. A single-frequency-point terahertz antenna used for receiving terahertz signals in the traditional detector is replaced with a multi-frequency-point terahertz antenna (the bandwidth of each frequency point can be designed as a narrow band according to actual needs), thereby realizing that one detector supports the detection of multiple arbitrary different frequency points. However, the traditional detector needs to replace detectors with different frequency points for detection of different frequency points. The present solution can design a multi-frequency-point terahertz antenna with arbitrary different frequency points according to actual needs, so that one detector can support the detection of multiple arbitrary different frequency points without the replacement of the terahertz detector, effectively reducing the cost of terahertz detection and imaging.

2. On the basis of the multi-frequency-point terahertz antenna structure, an N×M terahertz detector array based on the multi-frequency antenna structure is proposed. The resonance of terahertz waves with free electron groups in the detector antenna array can enhance the energy of low kinetic energy electrons in the antenna, which improves the detection sensitivity, and at the same time provides a new solution and idea for the realization of high-sensitivity, low-cost terahertz cameras and terahertz security detectors.

3. The introduction of the detector and readout circuit test switch can test the detector units and the readout circuit separately when the circuit fails, which is advantageous to quickly find the cause and location of the specific circuit failure.

BRIEF DESCRIPTION OF THE DRAWINGS

In order to more clearly illustrate the technical solutions in embodiments of the present disclosure or the prior art, the services that need to be used in the description of the embodiments or the prior art will be briefly described below. Obviously, the drawings in the following description are only some embodiments of the present disclosure, and other drawings can be obtained by those of ordinary skill in the art from these without creative efforts.

FIG. 1 is a schematic structural diagram of an N×M terahertz detector array imaging system based on a multi-frequency antenna structure according to the present disclosure.

DETAILED DESCRIPTION

The present disclosure will be further described below in conjunction with specific embodiments:

As shown in FIG. 1, an N×M terahertz detector array imaging system based on a multi-frequency antenna structure includes an N×M detector array, a detector and readout circuit test switch, and a readout circuit.

Specifically, the N×M detector array includes N×M detector units (D11, D12, D13, . . . , DNM) arranged in rows and columns, N row selection switches (Row1, Row2, Row3, . . . , RowN), and M column selection switches (Column1, Column2, Column3, . . . , ColumnM); and each detector unit includes a multi-frequency-point terahertz antenna, a matching network up transmission lines TL1, TL2 and TL3, a DC blocking capacitor C1, a bias voltage Vb1, a bias resistor Rb1, a Schottky diode SBD and an NMOSFET.

The multi-frequency-point terahertz antenna is connected to a left port of the transmission line TL1, a right port of the transmission line TL2 is connected to an anode of the Schottky diode SBD, and a cathode of the Schottky diode SBD is connected to ground; the bias resistor Rb1 is connected between the anode of the Schottky diode SBD and the bias voltage Vb1, and is used to supply power to the Schottky diode SBD; the transmission line TL3 of the matching network is separately connected to one end of the DC blocking capacitor C1 and an $M_{SEL}$ terminal of the NMOSFET, and the other end of the DC blocking capacitor C1 is grounded; an SEL terminal of the NMOSFET in each detector unit is connected to a column selection switch of a column where it is located; a $V_{out}$ terminal of the NMOSFET in each detector unit is connected to a row selection switch of a row where it is located; and the detector and readout circuit test switch is connected between the N row selection switches and the readout circuit.

Specifically, the matching network adopts a grounded coplanar waveguide transmission line; and port impedance of the multi-frequency-point terahertz antenna is consistent with left port impedance of the transmission line TL1, the left port impedance of the transmission line TL1 is consistent with right port impedance of the transmission line TL2, and the right port impedance of the transmission line TL2 is consistent with port impedance of the anode of the Schottky diode.

Specifically, the above-mentioned readout circuit includes a low-noise chopper amplifier and a high-resolution analog-to-digital converter, wherein the low-noise chopper amplifier is connected between the N row selection switches and the high-resolution analog-to-digital converter, amplifies a received terahertz signal and uses chopper circuit technology to reduce the amplifier's own offset and 1/f noise; and the high-resolution analog-to-digital converter digitizes the amplified terahertz signal for back-end signal processing.

The detector and readout circuit test switch includes a detector test switch S1 and a readout circuit test switch S2; and the detector test switch S1 and the readout circuit test switch S2 are separately connected between the N row selection switches and the readout circuit. It is mainly convenient to test each detector unit (D11, D12, D13, . . . , DNM) and the readout circuit separately in the process of circuit failure, so as to determine the specific cause and location of the failure.

In this embodiment, the specific working process of the N×M terahertz detector array imaging system based on the multi-frequency antenna structure is as follows:

When a row selection switch and a column selection switch of the detector are turned on (for example, a row selection switch Row1 and a column selection switch Column1 are turned on), the detector test switch S1 is turned off, and the readout circuit test switch S2 is turned off, a terahertz signal received by the detector is amplified by the chopper amplifier, then enters the high-resolution analog-to-digital converter for digital processing, and thereafter is output from $D_{out}$.

When a row selection switch and a column selection switch of the detector are turned on (for example, a row selection switch Row1 and a column selection switch Column1 are turned on), the detector test switch S1 is turned on, and the readout circuit test switch S2 is turned off, the performance test of the detector is performed. If a terahertz signal can be received, then it indicates that the detector D11 is working normally, otherwise the detector D11 is malfunctioning.

When the row selection switches and column selection switches of the detector are all turned off, the detector test switch S1 is turned off, and the readout circuit test switch S2 is turned on, the performance test of the readout circuit is performed. If a signal digitized by the high-resolution analog-to-digital converter is normally outputted at $D_{out}$, then it indicates that the readout circuit is working normally, otherwise the readout circuit is malfunctioning.

A single-frequency-point terahertz antenna used for receiving terahertz signals in the traditional detector is replaced with a multi-frequency-point terahertz antenna (the bandwidth of each frequency point can be designed as a narrow band according to actual needs), thereby realizing that one detector supports the detection of multiple arbitrary different frequency points. However, the traditional detector needs to replace detectors with different frequency points for detection of different frequency points. This embodiment may design a multi-frequency-point terahertz antenna with arbitrary different frequency points according to actual needs, so that one detector may support the detection of multiple arbitrary different frequency points without the replacement of the terahertz detector, effectively reducing the cost of terahertz detection and imaging.

In addition, on the basis of the multi-frequency-point terahertz antenna structure, an N×M terahertz detector array based on the multi-frequency antenna structure is proposed. The resonance of terahertz waves with free electron groups in the detector antenna array may enhance the energy of low kinetic energy electrons in the antenna, thereby improving the detection sensitivity.

The embodiments described above are only preferred embodiments of the present disclosure, and do not limit the scope of implementation of the present disclosure. Therefore, any changes made according to the shape and principle of the present disclosure should be covered by the scope of protection of the present application.

What is claimed is:

1. An N×M terahertz detector array imaging system based on a multi-frequency antenna structure, comprising an N×M detector array, a detector and readout circuit test switch, and a readout circuit;

wherein the N×M detector array comprises N×M detector units arranged in rows and columns, N row selection switches, and M column selection switches; and each detector unit comprises a multi-frequency-point terahertz antenna, a matching network comprising transmission lines TL1, TL2, and TL3, a DC blocking capacitor C1, a bias voltage Vb1, a bias resistor Rb1, a Schottky diode SBD, and an NMOSFET; and wherein the multi-frequency-point terahertz antenna is connected to a left port of the transmission line TL1, a right port of the transmission line TL2 is connected to an anode of the Schottky diode SBD, and a cathode of the Schottky diode SBD is connected to ground;

the bias resistor Rb1 is connected between the anode of the Schottky diode SBD and the bias voltage Vb1, and is used to supply power to the Schottky diode SBD;

the transmission line TL3 of the matching network is separately connected to one end of the DC blocking capacitor C1 and an $M_{SEL}$ terminal of the NMOSFET, and the other end of the DC blocking capacitor C1 is grounded;

an SEL terminal of the NMOSFET in each detector unit is connected to a column selection switch of a column where it is located;

a $V_{out}$ terminal of the NMOSFET in each detector unit is connected to a row selection switch of a row where it is located; and the detector and readout circuit test switch is connected between the N row selection switches and the readout circuit.

2. The N×M terahertz detector array imaging system based on the multi-frequency antenna structure according to claim 1, wherein the matching network adopts a grounded coplanar waveguide transmission line.

3. The N×M terahertz detector array imaging system based on the multi-frequency antenna structure according to claim 1, wherein port impedance of the multi-frequency-point terahertz antenna is consistent with left port impedance of the transmission line TL1, the left port impedance of the transmission line TL1 is consistent with right port impedance of the transmission line TL2, and the right port impedance of the transmission line TL2 is consistent with port impedance of the anode of the Schottky diode.

4. The N×M terahertz detector array imaging system based on the multi-frequency antenna structure according to claim 1, wherein the readout circuit comprises a low-noise chopper amplifier and a high-resolution analog-to-digital converter; the low-noise chopper amplifier is connected between the N row selection switches and the high-resolution analog-to-digital converter, amplifies a received terahertz signal and uses chopper circuit technology to reduce the amplifier's own offset and 1/f noise; and the high-resolution analog-to-digital converter digitizes the amplified terahertz signal for back-end signal processing.

5. The N×M terahertz detector array imaging system based on the multi-frequency antenna structure according to claim 1, wherein the detector and readout circuit test switch comprises a detector test switch S1 and a readout circuit test switch S2; and the detector test switch S1 and the readout circuit test switch S2 are separately connected between the N row selection switches and the readout circuit.

* * * * *